(12) United States Patent
Badr et al.

(10) Patent No.: US 11,232,792 B2
(45) Date of Patent: *Jan. 25, 2022

(54) PROACTIVE INCORPORATION OF UNSOLICITED CONTENT INTO HUMAN-TO-COMPUTER DIALOGS

(71) Applicant: Google LLC, Mountain View, CA (US)

(72) Inventors: Ibrahim Badr, Zurich (CH); Zaheed Sabur, Zurich (CH); Vladimir Vuskovic, Zurich (CH); Adrian Zumbrunnen, Zurich (CH); Lucas Mirelmann, Zurich (CH)

(73) Assignee: Google LLC, Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/829,323

(22) Filed: Mar. 25, 2020

(65) Prior Publication Data

US 2020/0227043 A1 Jul. 16, 2020

Related U.S. Application Data

(63) Continuation of application No. 15/466,422, filed on Mar. 22, 2017, now Pat. No. 10,636,418.

(51) Int. Cl.
*G10L 15/22* (2006.01)
*G06F 16/903* (2019.01)
(Continued)

(52) U.S. Cl.
CPC ........ *G10L 15/22* (2013.01); *G06F 16/90335* (2019.01); *G06N 3/006* (2013.01);
(Continued)

(58) Field of Classification Search
CPC .............. G06F 16/90335; G06N 3/006; G10L 15/1815; G10L 15/1822; G10L 15/22; G10L 2015/223
See application file for complete search history.

(56) References Cited

U.S. PATENT DOCUMENTS 6,731,307 B1 5/2004 Strubbe et al.
8,612,226 B1 12/2013 Epstein et al.
(Continued)

FOREIGN PATENT DOCUMENTS

| CN | 101588323 | 11/2009 |
|---|---|---|
| CN | 102792320 | 11/2012 |

(Continued)

OTHER PUBLICATIONS

Japanese Patent Office: Office Action issued in Application No. 2019-552127 dated Nov. 2, 2020.
(Continued)

*Primary Examiner* — Angela A Armstrong
(74) *Attorney, Agent, or Firm* — Middleton Reutlinger

(57) ABSTRACT

Methods, apparatus, and computer readable media are described related to automated assistants that proactively incorporate, into human-to-computer dialog sessions, unsolicited content of potential interest to a user. In various implementations, in an existing human-to-computer dialog session between a user and an automated assistant, it may be determined that the automated assistant has responded to all natural language input received from the user. Based on characteristic(s) of the user, information of potential interest to the user or action(s) of potential interest to the user may be identified. Unsolicited content indicative of the information of potential interest to the user or the action(s) may be generated and incorporated by the automated assistant into the existing human-to-computer dialog session. In various implementations, the incorporating may be performed in response to the determining that the automated assistant has responded to all natural language input received from the user during the human-to-computer dialog session.

20 Claims, 10 Drawing Sheets

(51) Int. Cl.
*G10L 15/18* (2013.01)
*G06N 3/00* (2006.01)

(52) U.S. Cl.
CPC ...... *G10L 15/1815* (2013.01); *G10L 15/1822* (2013.01); *G10L 2015/223* (2013.01)

(56) References Cited

U.S. PATENT DOCUMENTS

| | | | |
|---|---|---|---|
| 9,117,447 | B2 | 8/2015 | Gruber et al. |
| 9,368,114 | B2 | 6/2016 | Larson et al. |
| 9,865,260 | B1* | 1/2018 | Vuskovic ............. G06F 40/295 |
| 10,636,418 | B2* | 4/2020 | Badr ..................... G06N 3/006 |
| 2004/0162724 | A1 | 8/2004 | Hill et al. |
| 2005/0054381 | A1 | 3/2005 | Lee et al. |
| 2005/0131695 | A1 | 6/2005 | Lucente et al. |
| 2007/0201636 | A1 | 8/2007 | Gilbert et al. |
| 2008/0115068 | A1 | 5/2008 | Smith |
| 2008/0189110 | A1 | 8/2008 | Freeman et al. |
| 2009/0150156 | A1 | 6/2009 | Kennewick et al. |
| 2010/0088100 | A1 | 4/2010 | Lindahl |
| 2010/0205541 | A1 | 8/2010 | Rapaport et al. |
| 2010/0217657 | A1 | 8/2010 | Gazdzinski |
| 2010/0241963 | A1 | 9/2010 | Kulis et al. |
| 2010/0250672 | A1 | 9/2010 | Vance et al. |
| 2011/0066634 | A1 | 3/2011 | Phillips et al. |
| 2011/0271194 | A1 | 11/2011 | Lin et al. |
| 2012/0290950 | A1 | 11/2012 | Rapaport et al. |
| 2013/0110505 | A1 | 5/2013 | Gruber et al. |
| 2013/0159377 | A1 | 6/2013 | Nash |
| 2013/0275164 | A1 | 10/2013 | Gruber et al. |
| 2013/0317823 | A1 | 11/2013 | Mengibar |
| 2014/0129651 | A1 | 5/2014 | Gelfenbeyn et al. |
| 2014/0236953 | A1 | 8/2014 | Rapaport et al. |
| 2014/0278400 | A1 | 9/2014 | Coussemaeker et al. |
| 2014/0310001 | A1 | 10/2014 | Kalns et al. |
| 2015/0046147 | A1 | 2/2015 | Waibel et al. |
| 2015/0169284 | A1 | 6/2015 | Quast et al. |
| 2015/0169336 | A1 | 6/2015 | Harper et al. |
| 2015/0178388 | A1 | 6/2015 | Winnemoeller et al. |
| 2015/0254058 | A1 | 9/2015 | Klein et al. |
| 2015/0269612 | A1 | 9/2015 | Cucerzan |
| 2016/0294739 | A1 | 10/2016 | Stoehr et al. |
| 2016/0321573 | A1 | 11/2016 | Vangala et al. |
| 2017/0006356 | A1 | 1/2017 | Krasadakis |
| 2017/0083628 | A1 | 3/2017 | Frenkel et al. |
| 2017/0180276 | A1 | 6/2017 | Gershony et al. |
| 2018/0061421 | A1 | 3/2018 | Sarikaya |
| 2018/0068656 | A1 | 3/2018 | Lehman et al. |
| 2018/0098030 | A1 | 4/2018 | Morabia et al. |
| 2018/0137856 | A1 | 5/2018 | Gilbert |
| 2018/0373405 | A1 | 12/2018 | Donahue et al. |

FOREIGN PATENT DOCUMENTS

| | | |
|---|---|---|
| CN | 102947823 | 2/2013 |
| CN | 103577531 | 2/2014 |
| CN | 104603830 | 5/2015 |
| CN | 105359138 | 2/2016 |
| CN | 106020488 | 10/2016 |
| CN | 106559321 | 4/2017 |
| EP | 2884409 | 6/2015 |
| JP | 2001188784 | 12/1999 |
| JP | 2003108191 | 4/2003 |
| JP | 2005167628 | 6/2005 |
| JP | 2009116552 | 5/2009 |
| JP | 2015156231 | 8/2015 |
| KR | 20130000423 | 1/2013 |
| WO | 2011088053 | 7/2011 |
| WO | 2015187048 | 12/2015 |

OTHER PUBLICATIONS

Yoshino et al., Spoken Dialogue System Using Information Extraction from the Web (No. 82, pp. 1-6), Information Processing Society of Japan, Spoken Language Processing (SLP) dated Oct. 15, 2010.

Yoshino et al., Spoken Dialogue System Based on Information Extraction and Presentation Using Similarity of Predicate Argument Structures (vol. 52, No. 12, pp. 3386-3397), Journal of Information Processing Society of Japan dated Dec. 15, 2011.

Yoshino et al., "Spoken Dialogue System based on Information Extraction from Web Text" The Special Interest Group Technical Reports of IPSJ Spoken Language Information Processing (SLP) No. 82, Aug. 15, 2010, pp. 1-6.

Japanese Patent Office: Office Action issued for Application No. 2019-560296 dated Nov. 2, 2020.

Korean Patent Office; Office Action issued in Application No. 20197031202; 15 pages; dated Mar. 31, 2021.

China National Intellectual Property Administration; Notification of First Office Action issued in Application No. 201711146949.2; 16 pages; dated Jun. 3, 2021.

Japanese Patent Office; Notice of Allowance issued in Application No. 2019-552127; 3 pages; dated May 24, 2021.

International Search Report and Written Opinion fo PCT Ser. No. PCT/US2017/059110, dated May 30, 2018; 16 pages.

"Bots: An introduction for developers;" 13 sheets [online] [found on May 15, 2017], available in the Internet as URL: https://core.telegram.org/bots.

Constine, Josh "Facebook will launch group chatbots at F8;" Posted Mar. 29, 2017, TechCrunch, 9 sheets [online] [found on May 15, 2017], available in the Internet as URL: https://techcrunch.com/2017/03/29/facebook-group-bots/.

Mchugh, Molly "Slack is Overrun with Bots. Friendly, Wonderful Bots;" Aug. 21, 2015, Then One/Wired, 10 sheets [online] [found on May 15, 2017], available in the Internet as URL: https://www.wired.com/2015/08/slack-overrun-bots-friendly-wonderful-bots/.

Metz, Rachel "Messaging App Adds and Assistant to the Conversation;" Apr. 4, 2014, MIT Technology Review, 9 sheets [online] [found on May 15, 2017], available in the Internet as URL: https://www.technologyreview.com/s/525991/messaging-app-adds-an-assistant-to-the-conversation/.

Minker, W., et al. "Next-generation human-computer interfaces— towards intelligent, adaptive and proactive spoken anguage dialogue systems." In Intelligent Environments, 2006. IE 06. 2nd IET International Conference on (vol. 1, pp. 213-219). IET.

European Patent Office; Invitation to Pay Additional Fees in International Patent Application No. PCT/US2017/059110; 13 pages; dated Feb. 22, 2018.

Becker, Christian, et al. "Simulating the Emotion Dynamics of a Multimodal Conversational Agent." In Tutorial and Research Workshop on Affective Dialogue Systems, pp. 154-165. Springer Berlin Heidelberg, 2004.

L'Abbate, Marcello. "Modelling Proactive Behaviour of Conversational Interfaces." PhD diss., Technische Universität; 170 pages. 2006.

European Patent Office; International Search Report and Written Opinion of PCT Ser. No. PCT/US2018/040057; 15 pages; dated Sep. 28, 2018.

Korean Patent Office; Decision of Rejection issued in Application No. 20197031202; 8 pages; dated Oct. 26, 2021.

* cited by examiner

PROACTIVE INCORPORATION OF UNSOLICITED CONTENT INTO HUMAN-TO-COMPUTER DIALOGS

BACKGROUND

Humans may engage in human-to-computer dialogs with interactive software applications referred to herein as "automated assistants" (also referred to as "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. Automated assistants are typically reactive, as opposed to proactive. For example, at the onset of a human-to-computer dialog session between a user and an automated assistant (e.g., when there is no currently-applicable conversational context), the automated assistant may provide at most a generic greeting, such as "Hi," "Good morning," etc. The automated assistant does not proactively obtain and provide specific information of potential interest to the user. Consequently, the user must provide initial natural language input (e.g., spoken or typed) before the automated assistant will respond with substantive information and/or initiate one or more tasks on behalf of the user.

SUMMARY

Techniques are described herein for configuring automated assistants to proactively incorporate, into existing or newly-initiated human-to-computer dialog sessions, unsolicited content of potential interest to a user. In some implementations, an automated assistant configured with selected aspects of the present disclosure—and/or one or more other components acting in cooperation with an automated assistant—may perform such incorporation when it determines that in an existing human-to-computer dialog session, the automated assistant has effectively fulfilled its obligations to the user (e.g., the automated assistant is awaiting further instructions). This can be as simple as the user uttering "Good morning" and the automated assistant providing a generic response, "Good morning to you." In such a scenario, the user may likely still be engaged (at least briefly) with the human-to-computer dialog session (e.g., a chatbot screen showing an ongoing transcript of the human-to-computer dialog may still be open, the user may still be within earshot of an audio input/output device through which the human-to-computer dialog is implemented, etc.). Accordingly, any unsolicited content that is incorporated into the human-to-computer dialog session is likely to be consumed (e.g., heard, seen, perceived, understood, etc.) by the user.

Incorporating unsolicited content of potential interest to a user into a human-to-computer dialog session may have several technical advantages. The automated assistant may appear more "lifelike" or "human" to the user, which may incentivize increased interaction with the automated assistant. Also, the incorporated content is likely to be interesting to the user because it is selected based on one or more characteristics of the user, such as the user's current content (e.g., location, status, etc.), travel plans, known topics of interest, etc. Consequently, a user may be relieved of affirmatively soliciting such content, which may conserve computing resources that otherwise would be used to process the user's natural language input, and/or which may be helpful for users having diminished capabilities to provide inputs (e.g., driving, physical limitations, etc.). Additionally, the user may receive potentially helpful content that it may not otherwise have occurred to the user to solicit. As yet another example, incorporation of unsolicited content may provide a user with information that the user otherwise may have sought by submitting additional requests. Avoiding such additional requests may conserve computing resources (e.g., network bandwidth, processing cycles, battery power) required to parse and/or interpret these requests.

In some implementations, the automated assistant may initiate a human-to-computer dialog (for incorporation of unsolicited content) and/or incorporate unsolicited content into an existing human-to-computer dialog in response to various events. In some implementations, the event may comprise a determination that the user is within earshot of the automated assistant. For example, a standalone interactive speaker operating an automated assistant may detect, e.g., using various types of sensors (e.g., an IP webcam, or a motion sensor/camera incorporated into an appliance such as a smart thermostat, smoke detector, carbon monoxide detector, etc.) or by detecting co-presence of another computing device carried by the user, that the user is nearby. In response, the automated assistant may audibly provide unsolicited content to the user, such as "don't forget your umbrella today, rain is expected," "Don't forgot today is your sister's birthday," "Did you hear about last night's injury to <sports team's> power forward?", or "<stock> has gone up 8% over the last several hours."

In some implementations, an automated assistant operating on a first computing device of a coordinated ecosystem of computing devices associated with a user may receive one or more signals from another computing device of the ecosystem. Such signals may include computing interactions by the user (e.g., the user is performing a search, researching a topic, reading a particular article), states of application(s) operating on another computing device (e.g., consuming media, playing a game, etc.), and so forth. For example, suppose a user is listening to a particular musical artist on a standalone interactive speaker (which may or may not operate an instance of the automated assistant). An automated assistant on the user's smart phone may audibly detect the music and/or receive one or more signals from the standalone interactive speaker, and in response, incorporate, into a newly-initiated or preexisting human-to-computer dialog, unsolicited content such as additional information about the artist (or the song), recommendations regarding other similar artists/songs, notification(s) of upcoming tour dates or other artist-related events, etc.

Unsolicited content that is incorporated into a human-to-computer dialog may include information of potential interest to a user (e.g., weather, scores, traffic information, answers to questions, reminders, etc.) and/or actions of potential interest to a user (e.g., play music, create reminder, add item to shopping list, create etc.). Information and/or actions of potential interest be selected based on a variety of signals. In some implementations, the signals may include past human-to-computer dialogs between a user and an automated assistant. Suppose that during a first human-to-computer session, a user researches flights to a particular destination, but does not purchase any tickets. Suppose further that a subsequent human-to-computer dialog between the automated assistant and the user is triggered, and that the automated assistant determines that it has responded to all natural language inputs from the user. In such a scenario, the user has not yet provided any additional natural language input to the automated assistant. Accordingly, the automated assistant may take the initiative to incorporate unsolicited content including information relating to the user's previous flight search, such as "Did you ever buy a ticket to your destination," or "I don't know if you're still looking for a flight, but I found a good deal on <website>."

Other signals that may be used to select information and/or actions to be incorporated as unsolicited content into a human-to-computer dialog include, but are not limited to, user location (e.g., which might prompt the automated assistant to proactively suggest particular menu items, specials, etc.), calendar entries (e.g., "Don't forget your anniversary is next Monday"), appointments (e.g., an upcoming flight may prompt an automated assistant to proactively remind the user to perform online checkin and/or to start packing), reminders, search history, browsing history, topics of interest (e.g., interest in a particular sports team might cause an automated assistant to proactively ask the user, "Did you see the score last night?"), documents (e.g., an email including an invitation to an upcoming event might prompt the automated assistant to proactively remind the user of the upcoming event), application states (e.g., "I've performed updates of these three applications," "I see that you still have several applications open, which may strain the resources of your device," "I see you're currently streaming <movie> to your television; did you know that <trivia about movie>?", etc.), newly-available features (e.g., "Welcome back. While you were away I learned to call a taxi. Just tell me whenever you need one"), weather (e.g., "I see that it is nice outside. Would you like me to search for restaurants with outdoor dining?"), and so forth.

In some implementations, a method performed by one or more processors is provided that includes: determining, by one or more processors, that in an existing human-to-computer dialog session between a user and an automated assistant, the automated assistant has responded to all natural language input received from the user during the human-to-computer dialog session; identifying, by one or more of the processors, based on one or more characteristics of the user, information of potential interest to the user or one or more actions of potential interest to the user; generating, by one or more of the processors, unsolicited content indicative of the information of potential interest to the user or the one or more actions of potential interest; and incorporating, by the automated assistant into the existing human-to-computer dialog session, the unsolicited content. In various implementations, at least the incorporating is performed in response to the determining that the automated assistant has responded to all natural language input received from the user during the human-to-computer dialog session.

These and other implementations of technology disclosed herein may optionally include one or more of the following features.

In various implementations, the unsolicited content may include unsolicited natural language content. In various implementations, the identifying may be based at least in part on one or more signals obtained from one or more computing devices operated by the user. In various implementations, the one or more computing devices operated by the user may include the given computing device currently operated by the user.

In various implementations, the one or more signals may be received from another computing device of the one or more computing devices operated by the user that is different than the given computing device currently operated by the user. In various implementations, the one or more signals may include an indication of a state of an application executing on the another computing device. In various implementations, the indication of the state of the application may include an indication that the application is providing media playback. In various implementations, the indication of the state of the application may include an indication that the application has received a search query from the user or provided search results to the user.

In various implementations, the method may further include determining, by one or more of the processors, a desirability measure that is indicative of the user's desire to receive unsolicited content, wherein the desirability measure is determined based on one or more signals, and wherein at least the incorporating is performed in response to a determination that the desirability measure satisfies one or more thresholds. In various implementations, the unsolicited content may include one or more user interface elements, each user interface element being selectable, by the user, to cause the automated assistant to provide the information of potential interest to the user or to trigger one or more of the actions of potential interest to the user.

In another aspect, a method may include: determining, based on one or more signals, that a user is within earshot of one or more audio output devices; identifying, based at least in part on one or more characteristics of the user, information of potential interest to the user or one or more actions of potential interest to the user; generating unsolicited content indicative of the information of potential interest or the one or more actions of potential interest; and incorporating, into an audible human-to-computer dialog session between the automated assistant and the user, the unsolicited content. In various implementations, the incorporation may be performed by the automated assistant in response to the determination that the user is within earshot of the one or more audio output devices.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
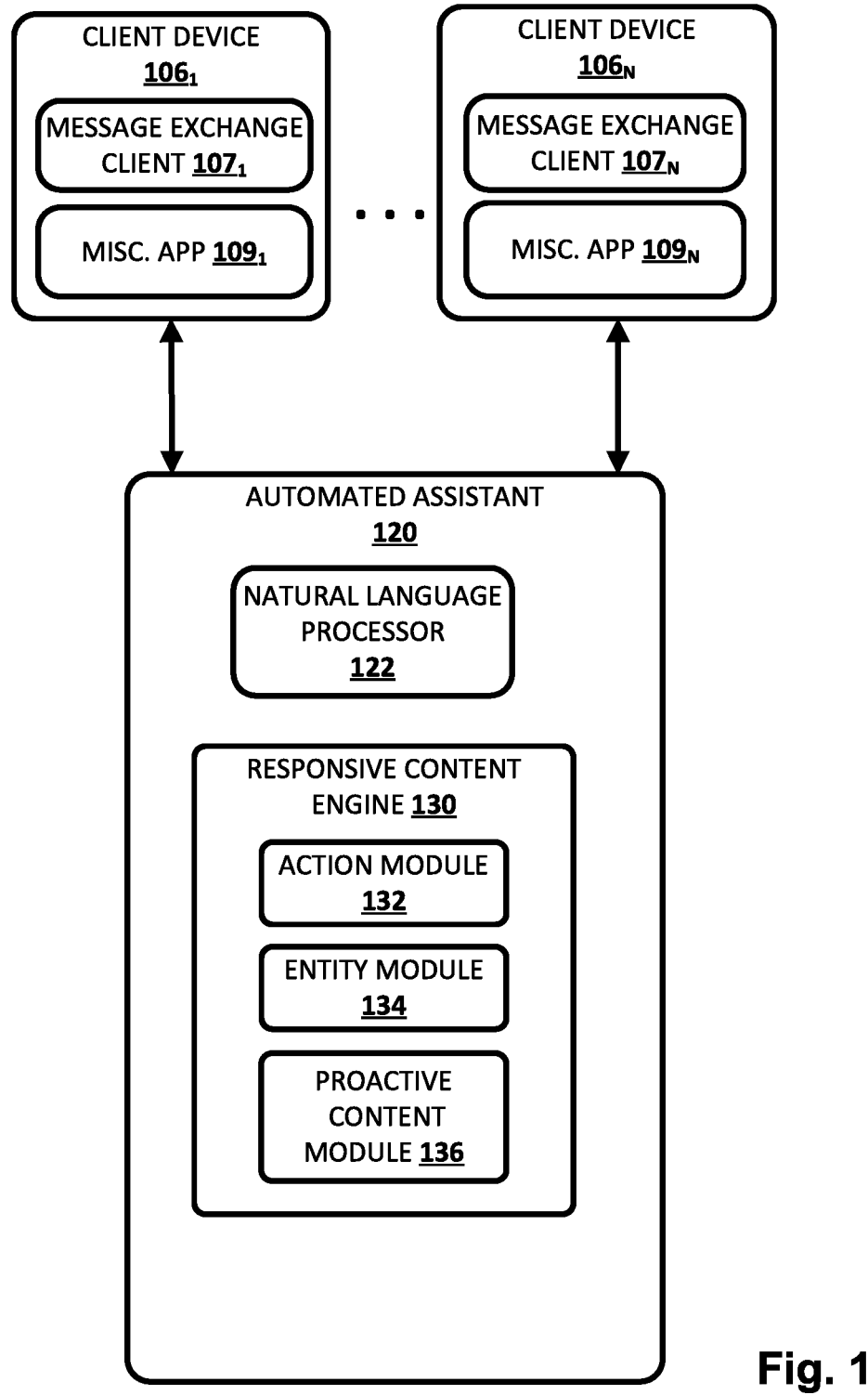
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of the automated assistant 120 may be implemented by one or more of the client computing devices $106_{1-N}$. For example, client device $106_1$ may implement one instance of or more aspects of automated assistant 120 and client device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated assistant 120 utilizing a plurality of client computing devices that collectively from a coordinated "ecosystem" of computing devices. In some such implementations, the automated assistant 120 may be considered to "serve" that particular user, e.g., endowing the automated assistant 120 with enhanced access to resources (e.g., content, documents, etc.) for which access is controlled by the "served" user. However, for the sake of brevity, some examples described in this specification will focus on a user operating a single client computing device 106.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

In addition to message exchange client 107, each of the client computing devices $106_{1-N}$ may also operate a variety of other applications ("MISC. APP" $109_{1-N}$ in FIG. 1). These other apps may include, but are not limited to, gaming applications, media playing applications (e.g., music players, video players, etc.), productivity applications (e.g., word processors, spreadsheet applications, etc.), web browsers, map applications, reminder applications, cloud storage applications, photography applications, and so forth. As will be explained in more detail below, various states of these other applications $109_{1-N}$ may be used in some embodiments as signals that prompt automated assistant 120 to incorporate unsolicited content into human-to-computer dialogs.

As described in more detail herein, the automated assistant 120 engages in human-to-computer dialog sessions with one or more users via user interface input and output devices of one or more client devices $106_{1-N}$. In some implementations, the automated assistant 120 may engage in a human-to-computer dialog session with a user in response to user interface input provided by the user via one or more user interface input devices of one of the client devices $106_{1-N}$. In some of those implementations, the user interface input is explicitly directed to the automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to the automated assistant 120 in one or more of the message exchange clients $107_{1-N}$ based on particular user interface input that indicates the automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, the automated assistant 120 may engage in a dialog session in response to user interface input, even when that user interface input is not explicitly directed to the automated assistant 120. For example, the automated assistant 120 may examine the contents of user interface input and engage in a dialog session in response to certain terms being present in the user interface input and/or based on other cues. In many implementations, the automated assistant 120 may engage interactive voice response ("IVR"), such that the user can utter commands, searches, etc., and the automated assistant may utilize natural language processing and/or one or more grammars to convert the utterances into text, and respond to the text accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by the automated assistant 120 may be distributed across multiple computer systems. Automated assistant 120 may be implemented as, for example, computer programs running on one or more computers in one or more locations that are coupled to each other through a network.

Automated assistant 120 may include a natural language processor 122 and a responsive content engine 130. In some implementations, one or more of the engines and/or modules of automated assistant 120 may be omitted, combined, and/or implemented in a component that is separate from automated assistant 120. Automated assistant 120 may engage in human-to-computer dialog sessions with one or more user(s), via associated client devices $106_{1-N}$, to provide responsive content generated and/or maintained by responsive content engine 130.

In some implementations, responsive content engine 130 generates responsive content in response to various inputs generated by a user of one of the client devices $106_{1-N}$ during a human-to-computer dialog session with the automated assistant 120. The responsive content engine 130 provides the responsive content (e.g., over one or more networks when separate from a client device of a user) for presenting to the user as part of the dialog session. For example, responsive content engine 130 may generate responsive content in in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and the automated assistant 120. The automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of the automated assistant 120, and so forth.

In some implementations, when the automated assistant 120 provides a prompt that solicits user feedback, the automated assistant 120 may preemptively activate one or more components of the client device (via which the prompt is provided) that are configured to process user interface input to be received in response to the prompt. For example, where the user interface input is to be provided via a microphone of the client device $106_1$, the automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of the automated assistant 120, such as responsive content engine 130. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger configured to annotate entity references in one or more segments such as references to people (including, for instance, literary characters), organizations, locations (real and imaginary), and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As mentioned above, the responsive content engine 130 utilizes one or more resources in generating suggestions and/or other content to provide during a dialog session with a user of one of the client devices $106_{1-N}$. In various implementations, the responsive content engine 130 may include an action module 132, an entity module 134, and a content module 136.

The action module 132 of the responsive content engine 130 utilizes natural language input received from client computing devices $106_{1-N}$, and/or annotations of natural language input provided by natural language processor 122, to determine at least one action that is responsive to the natural language input. In some implementations, the action module 132 may determine an action based on one or more terms included in the natural language input. For example, the action module 132 may determine an action based on the action being mapped, in one more computer readable media, to one or more terms included in the natural language input. For instance, an action of "add <item> to my shopping list"

may be mapped to one or more terms such as "I need <item> from the market . . . ," "I need to pick up <item>," "we're out of <item>," etc.

Entity module 134 determines candidate entities based on input provided by one or more users via user interface input device(s) during a dialog session between the user(s) and the automated assistant 120. The entity module 134 utilizes one or more resources in determining candidate entities and/or in refining those candidate entities. For example, the entity module 134 may utilize the natural language input itself and/or annotations provided by natural language processor 122.

Proactive content module 136 may be configured to proactively incorporate, into existing or newly-initiated human-to-computer dialog sessions, unsolicited content of potential interest to a user. For example, in some implementations, proactive content module 136 may determine—e.g., based on data received from other modules, such as natural language processor 122, action module 132, and/or entity module 134—that in an existing human-to-computer dialog session between a user and automated assistant 120, automated assistant 120 has responded to all natural language input received from the user during the human-to-computer dialog session. Suppose a user operates client device 106 to request a search for particular information, and that automated assistant 120 performs the search (or causes the search to be performed) and returns responsive information as part of the human-to computer-dialog. At this point, unless the user has also requested other information, automated assistant 120 has fully responded to the user's request. In some implementations, proactive content module 136 may wait for some predetermined time interval (e.g., two seconds, five seconds, etc.) for automated assistant 120 to receive additional user input. If none is received during the time interval, proactive content module 136 may determine that it has responded to all natural language input received from the user during the human-to-computer dialog session.

Proactive content module 136 may be further configured to identify, based on one or more characteristics of the user, information of potential interest to the user or one or more actions of potential interest to the user (collectively referred to herein as "content" of potential interest to the user). In some implementations, this identification of content of potential interest to the user may be performed by proactive content module 136 at various time intervals (e.g., regularly, continuously, periodically, etc.). Consequently, in some such implementations, proactive content module 136 may be continuously (or at least periodically) "primed" to provide unsolicited content of potential interest to the user. Additionally or alternatively, in some implementations, this identification of content of potential interest may be performed by proactive content module 136 in response to various events. One such event may be the determination that automated assistant 120 has responded to all natural language input received from the user during the human-to-computer dialog, and that no additional user input has been received by expiration of the aforementioned time interval. Other events that may trigger proactive content module 136 to identify content of potential interest to the user may include, for example, a user performing a search using a client device 106, a user operating a particular application on a client device 106, a user travelling to a new location (e.g., as detected by a position coordinate sensor of a client device or by a user "checking in" to a location on social media), a user being detected within earshot of a speaker under the control of an automated assistant, and so forth.

Characteristics of the user that may be used, e.g., by proactive content module 136, to determine content of potential interest to the user may come in various forms and may be determined from a variety of sources. For example, topics of interest to the user may be determined from sources such as the user's search history, browsing history, user-set preferences, location, media playing history, travel history, past human-to-computer dialog sessions between the user and automated assistant 120, and so forth. Thus, in some implementations, proactive content module 136 may have access to various signals or other data from one or more client devices 106 operated by a user, e.g., directly from the client devices 106 and/or indirectly via one or more computing systems operating as a so-called "cloud." Topics of interest to a user may include, for instance, particular hobbies (e.g., golfing, skiing, gaming, painting, etc.), literature, movies, musical genres, particular entities (e.g., artists, athletes, sports teams, companies), etc. Other characteristics of the user may include, for instance, age, location (e.g., determined from a position coordinate sensor of a client device 106, such as a Global Positioning System ("GPS") sensor or other triangulation-based position coordinate sensor), user-set preferences, whether the user is currently in a moving vehicle (e.g., as determined from an accelerometer of a client device 106), scheduled events of the user (e.g., as determined from one or more calendar entries), and so forth.

In various implementations, proactive content module 136 may be configured to generate unsolicited content that is indicative of the information of potential interest to the user and/or the one or more actions of potential interest, and incorporate the unsolicited content into a human-to-computer dialog. This unsolicited content may come in various forms that may be incorporated into an existing human-to-computer dialog session. For example, in some implementations in which the user is interacting with automated assistant 120 using a text-based message exchange client 107, the unsolicited content generated by proactive content module 136 may take the form of text, images, video, or any combination thereof, that may be incorporated into a transcript of the human-to-computer dialog rendered by message exchange client 107. In some implementations, the unsolicited content may include or take the form of a so-called "deep link" that is selectable by the user to expose a different application interface to the user. For example, a deep link may, when selected by a user, cause the client device 106 to launch (or make active) a particular application 109 in a particular state. In other implementations in which the user is interacting with automated assistant 120 using a speech interface (e.g., when automated assistant 120 operates on a standalone interactive speaker, or on an in-vehicle system), the unsolicited content may take the form of natural language output that is provided to the user audibly.

In some implementations, the incorporation of the unsolicited content may be performed in response to the determination, e.g., by proactive content module 136, that automated assistant 120 has responded to all natural language input received from the user during the human-to-computer dialog session. In some implementations, one or more of the other operations described above with respect to proactive content module 136 may also be performed in response to such an event. Or, as noted above, those operations may be performed by proactive content module 136 periodically or continuously so that proactive content module 136 (and hence, automated assistant 120) remains "primed" to quickly incorporate unsolicited content of potential interest to a user into an existing human-to-computer dialog session.

In some implementations, automated assistant 120 may provide unsolicited output even prior to initiation of a human-to-computer dialog session by a user. For example, in some implementations, proactive content module 136 be configured to determine, based on one or more signals, that a user is within earshot of the one or more audio output devices (e.g., a standalone interactive speaker, or a passive speaker that is operably coupled with a client device 106 that operates all or a portion of automated assistant 120). These signals may include, for instance, co-presence of one or more client devices 106 carried by the user with the audio output device, detection of physical user presence (e.g., using passive infrared, sound detection (e.g., detecting the user's voice), etc.), and so forth.

Once proactive content module 136 has determined that the user is within earshot of the one or more audio output devices, proactive content module 136 may: identify, based at least in part on one or more characteristics of the user, information of potential interest to the user or one or more actions of potential interest to the user (as described above); generate unsolicited content indicative of the information of potential interest or the one or more actions of potential interest; and/or incorporate, into an audible human-to-computer dialog session between automated assistant 120 and the user, the unsolicited content. As noted above, one or more of these additional operations may be performed in response to the determination that the user is within earshot of the audio output device(s). Additionally or alternatively, one or more of these operations may be performed periodically or continuously so that proactive content module 136 is always (or at least usually) "primed" to incorporate unsolicited content into a human-to-computer dialog.

Figure 2:
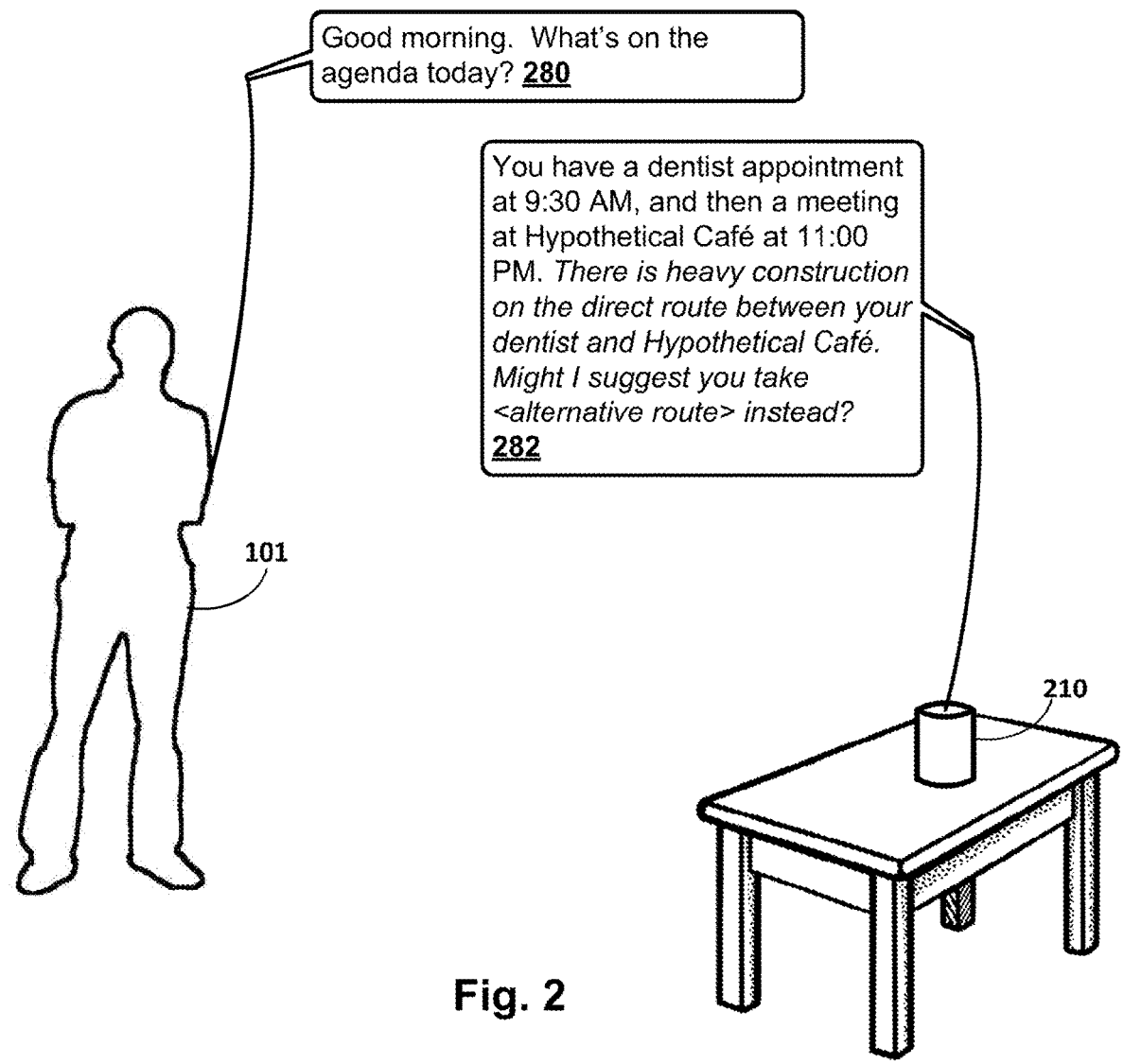
FIGS. 2, 3, 4, 5, 6, and 7 depict example dialogs between various users and automated assistants, in accordance with various implementations.

FIG. 2 illustrates an example of a human-to-computer dialog session between user 101 and an instance of automated assistant (120 in FIG. 1, not depicted in FIG. 2). FIG. 2 illustrates examples of dialog session that may occur, via the microphone(s) and speaker(s), between a user 101 of a computing device 210 (depicted as a standalone interactive speaker but this is not meant to be limiting) and the automated assistant 120 according to implementations described herein. One or more aspects of the automated assistant 120 may be implemented on the computing device 210 and/or on one or more computing devices that are in network communication with the computing device 210.

In FIG. 2, the user 101 provides natural language input 280 of "Good morning. What's on the agenda today?" to initiate a human-to-computer dialog session between the user 101 and the automated assistant 120. In response to the natural language input 280, the automated assistant 120 provides responsive natural language output 282 of "You have a dentist appointment at 9:30 AM and then a meeting at Hypothetical Café at 11:00 AM." Assuming these are the only two events on the user's schedule for the day, automated assistant 120 (e.g., by way of action module 132) has fully responded to the user's natural language input. However, rather than waiting for additional user input, automated assistant 120 (e.g., by way of proactive content module 136) may proactively incorporate additional content of potential interest to the user into the human-to-computer dialog of FIG. 2. For example, automated assistant 120 may search (or request another component to search) one or more travel routes between the location of the dentist and the meeting, e.g., to determine that the most direct route is under heavy construction. Because the two appointments are relatively close together, automated assistant 120 proactively incorporates the following unsolicited content (shown in italics) into the human-to-computer dialog: "There is heavy construction on the direct route between your dentist and Hypothetical Café. Might I suggest you take <alternative route> instead?"

Figure 3:
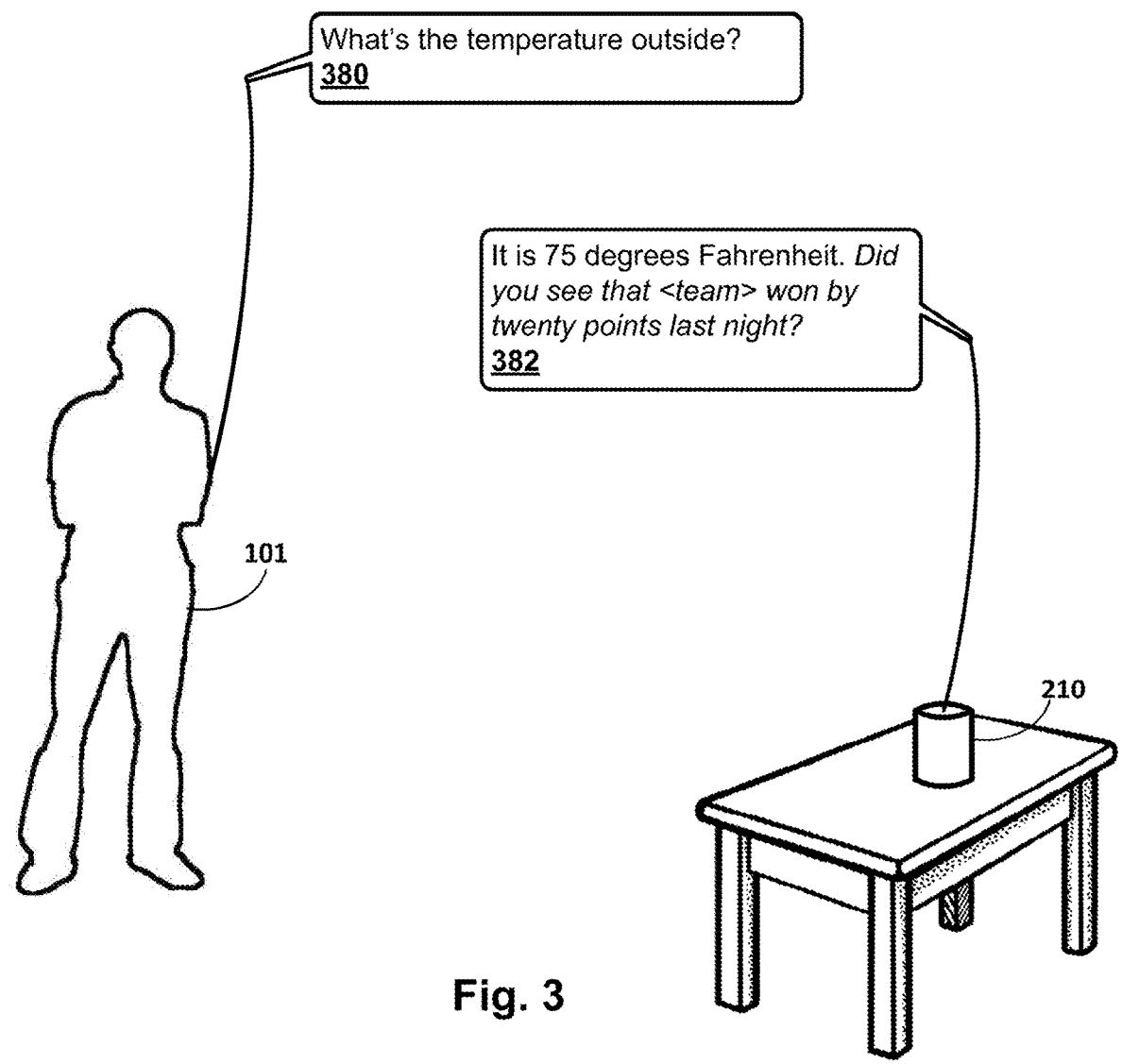

FIG. 3 depicts another example dialog between the user 101 and the automated assistant 120 operating on the computing device 210 during a different session. At 380, the user 101 speaks the phrase, "What's the temperature outside?" After determining the outside temperature from one or more sources (e.g., a weather-related web service), at 382, automated assistant 120 may reply, "It is 75 degrees Fahrenheit." Once again, automated assistant 120 (e.g., by way of proactive content module 136) may determine that it has fully responded to the user's natural language input. Accordingly, and based on an interest of user 101 in a particular team and a determination that the team won a game the prior evening, automated assistant 120 may proactively incorporate the following unsolicited content into the human-to-computer dialog: "Did you see that <team> won by twenty points last night?"

Figure 4:
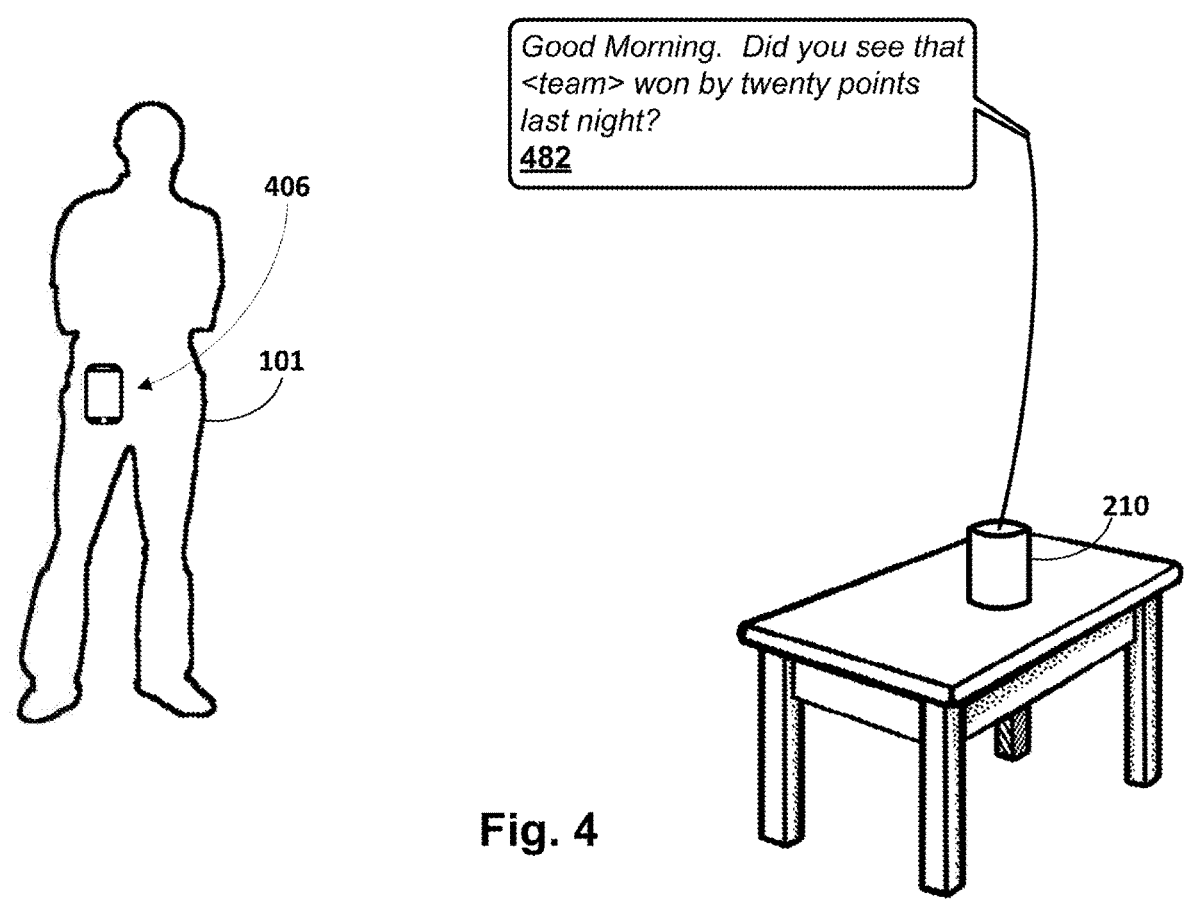

FIG. 4 depicts another example dialog between the user 101 and the automated assistant 120 operating on the computing device 210 during a different session. In this example, user 101 does not provide a natural language input. Instead, automated assistant 120 or another component operating on computing device 210 determines, e.g., based on one or more signals provided by a client device 406 (smart phone in this example), that user 101 is co-present with computing device 210, and thus is within earshot of audible output provided by computing device 210. Accordingly, at 482, automated assistant 120 proactively incorporates the unsolicited content (same unsolicited content as in FIG. 3) into a new human-to-computer dialog that is initiated by automated assistant based on co-presence of user 101 with computing device 210. The one or more signals provided by client device 406 to computing device 210 may include, for instance, a wireless signal (e.g., Wi-Fi, BlueTooth), a shared network (e.g., client device 406 joined the same Wi-Fi network as computing device 210, etc.

In some implementations, automated assistant 120 may proactively incorporate other content of potential interest to the user into the human-to-computer dialog on determining that user 101 is co-present with computing device 210. In some implementations, this other content may be determined, for instance, based on a state of an application operating on client device 406. Suppose user 101 is playing a game on client device 406. Automated assistant 120 on computing device 210 may determine that client device 406 is in a particular game-playing state, and may provide various unsolicited content of potential interest to the user, such as tips, tricks, recommendations of similar games, etc., as part of the human-to-computer dialog. In some implementations in which computing device 210 is a standalone interactive speaker, computing device 210 may even output background music (e.g., duplicating or adding background music) and/or sound effects associated with the game being played on client device 406, at least so long as user 101 remains co-present with computing device 210.

Figure 5:
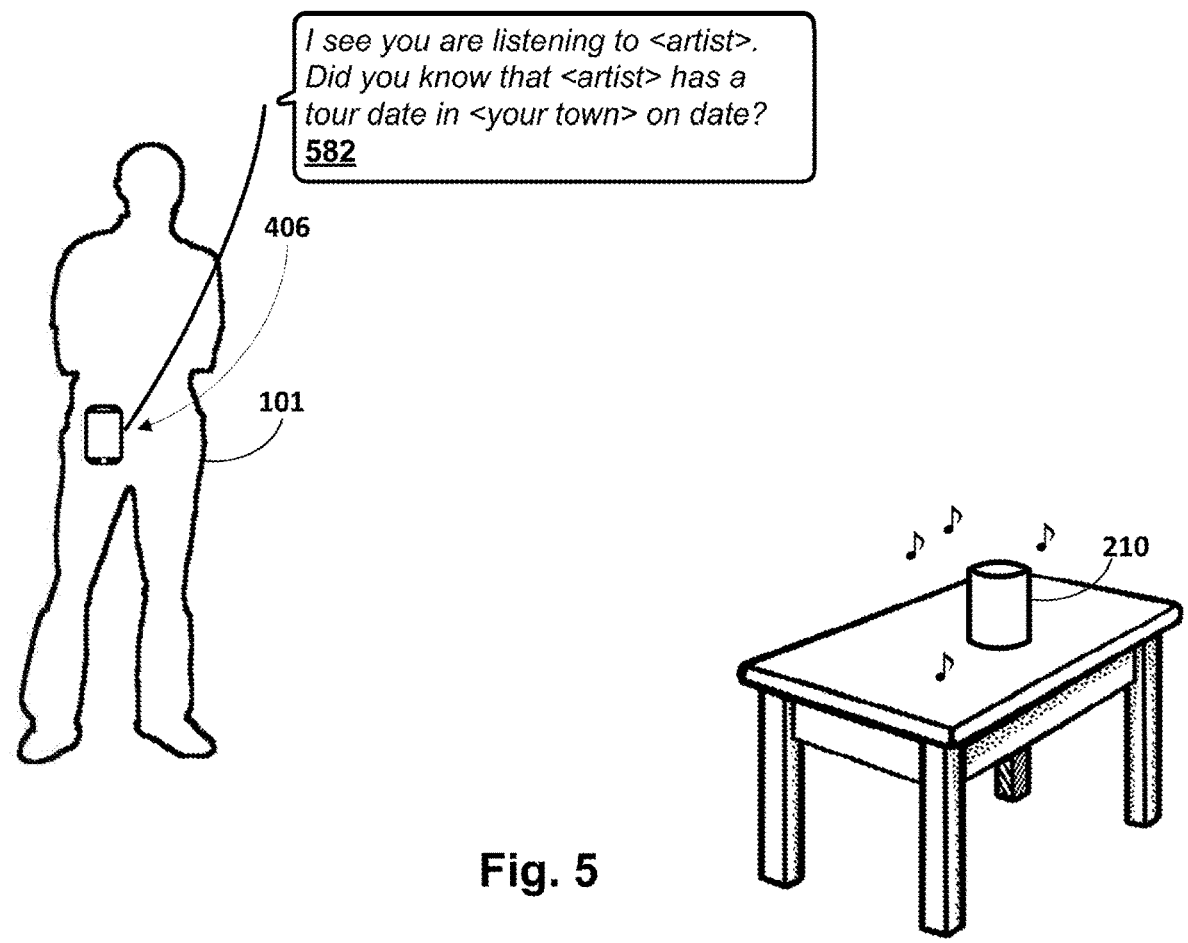

FIG. 5 depicts an example human-to-computer dialog between the user 101 and an instance of automated assistant 120 operating on client device 406. In this example, user 101 once again does not provide a natural language input. Instead, computing device 210 (once again taking the form of a standalone interactive speaker) is playing music. This music is detected at one or more audio sensors (e.g., microphones) of client device 406. One or more components of client device 406, such as a software application configured to analyze audibly-detected music, may identify one or more attributes of the detected music, such as artist/song/etc.

Another component, such as entity module 134 in FIG. 1, may use these attributes to search one or more online sources for information about the entity. Automated assistant 120 operating on client device 406 may then provide (at 582) unsolicited content—e.g., out loud via one or more speakers of client device 406 in FIG. 5—that informs user 101 of various information about the entity. For example, at 582 of FIG. 5, automated assistant 120 states, "Did see you are listening to <artist>. Did you know that <artist> has a tour date in <your town> on <date>?" Similar techniques may be applied by an instance of automated assistant 120 operating on a client device (e.g., a smart phone, tablet, laptop, standalone interactive speaker) when it detects (via sound and or visual detection) audio-visual content (e.g., movie, television program, sports event, etc.) being presented on a user's television.

In FIG. 5, computing device 210 is audibly outputting music that is "heard" by client device 406. However, suppose user 101 was listening to music using client device 406, instead of computing device 210. Suppose further that user 101 was listening to the music using earplugs, such that that music would only be audible to user 101, and not necessarily other computing devices such as computing device 210. In various implementations, particularly where client device 406 and computing device 210 are part of the same ecosystem of computing devices associated with user 101, computing device 210 may determine that a music playback application of client device 406 is currently in a state in which it is playing back music. For example, client device 406 may provide, e.g., using wireless communication technology such as Wi-Fi, Bluetooth, etc., an indication to nearby devices (such as computing device 210) of the state of the music playback application (and/or indications of states of other applications). Additionally or alternatively, for an ecosystem of computing devices operated by user 101, a global index of currently-executing applications and their respective states may be maintained (e.g., by an automated assistant that serves user 101) and available among computing devices of the ecosystem. Either way, once automated assistant 120 associated with computing device 210 learns of the state of the music playback application on client device 406, automated assistant 120 may proactively incorporate, e.g., into a human-to-computer dialog between user 101 and automated assistant 120 via computing device 210 (which may be triggered by automated assistant 120), content similar to that depicted at 582 in FIG. 5.

Figure 6:
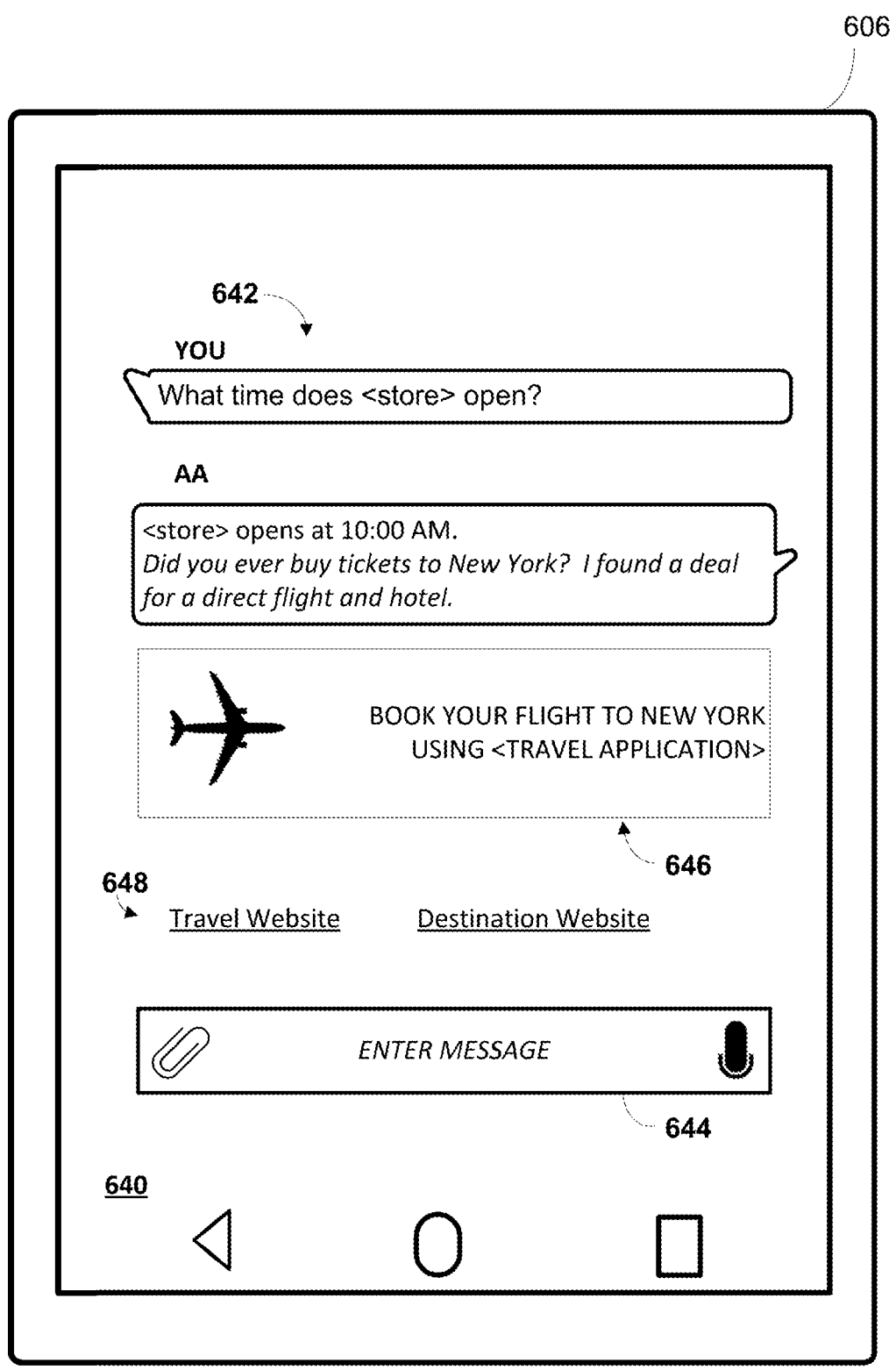

FIGS. 2-5 depict human-to-computer dialogs in which a user 101 engages with automated assistant 120 using audio input/output. However, this is not meant to be limiting. As noted above, in various implementations, users may engage automated assistants using other means, such as message exchange clients 107. FIG. 6 depicts an example in which a client device 606 in the form of a smart phone or tablet (but that is not meant to be limiting) includes a touchscreen 640. Rendered visually on touchscreen 640 is a transcript 642 of a human-to-computer dialog between a user ("You" in FIG. 6) of client device 606 and an instance of automated assistant 120 executing on client device 606. Also provided is an input field 644 in which the user is able to provide natural language content, as well as other types of inputs such as images, sound, etc.

In FIG. 6, the user initiates the human-to-computer dialog session with the question, "What time does <store> open?" Automated assistant 120 ("AA" in FIG. 6), e.g., by way of action module 132 or another component, performs one or more searches for information related to the store's hours, and replies, "<store> opens at 10:00 AM." At this point, automated assistant 120 has responded to the only natural language input provided by the user in the current human-to-computer dialog session. However, for this example, assume that the user had recently operated client device 606, or another client device in an ecosystem of client devices that also includes client device 606, to search for plane tickets to New York. The user could have performed this searching by way of engaging in one or more human-to-computer dialog sessions with automated assistant 120, by way of a web browser, or any combination thereof.

Based on this past searching activity, in some implementations, automated assistant 120 (e.g., by way of proactive content module 136) may—periodically/continuously or in response to determining that automated assistant 120 has responded to all received natural language input in the current human-to-computer dialog session—search one or more online sources for information that is pertinent to this search, and hence, potentially of interest to the user. Automated assistant 120 may then proactively incorporate the following unsolicited content into the human-to-computer dialog session depicted in FIG. 6: "Did you ever buy tickets to New York? I found a deal for a direct flight and hotel." Then, automated assistant 120 (e.g., by way of proactive content module 136) may incorporate into the human-to-computer dialog additional unsolicited content in the form of a user interface element (e.g., a deeplink) 646 that is selectable by the user to open a travel application installed on client device 606. If user interface element 646 is selected, the travel application may open to a predetermined state, e.g., with input about booking the flight to New York already prepopulated, so that the user can edit the prepopulated information and/or issue relatively few additional input commands to purchase the ticket. Other unsolicited content could be presented as selectable options as well, such as one or more hyperlinks 648 to webpages, e.g., for booking the ticket or for general information about the destination.

While the user interface element 646 in FIG. 6 is a visual element that can be selected by tapping or otherwise touching it, this is not meant to be limiting. A similar human-to-computer dialog as that depicted in FIG. 6 could take place audibly between a user and an audio output device (e.g., the standalone interactive speaker depicted in previous figures). In some such implementations, the user interface element may instead take the form of an audible prompt such as a question or option that may be "selected" if answered in the affirmative by the user. For example, instead of presenting the visual user interface element 646, automated assistant 120 may audibly output something like "Let me know if you would like me to open up <travel application> so that you can book your ticket to New York." In some implementations, the travel application itself may include its own automated assistant that is tailored specifically to engage in a human-to-computer dialog with users to book travel arrangements. In some such implementations, the user may be "passed on" to the travel application-specific automated assistant. In other implementations, automated assistant 120 may utilize various information and states associated with a travel application to formulate natural language output that solicits, from the user, information needed to book a ticket using the travel application. Automated assistant 120 may then interact with the travel application on behalf of the user (e.g., in response to spoken natural language inputs provided by the user).

Figure 7:
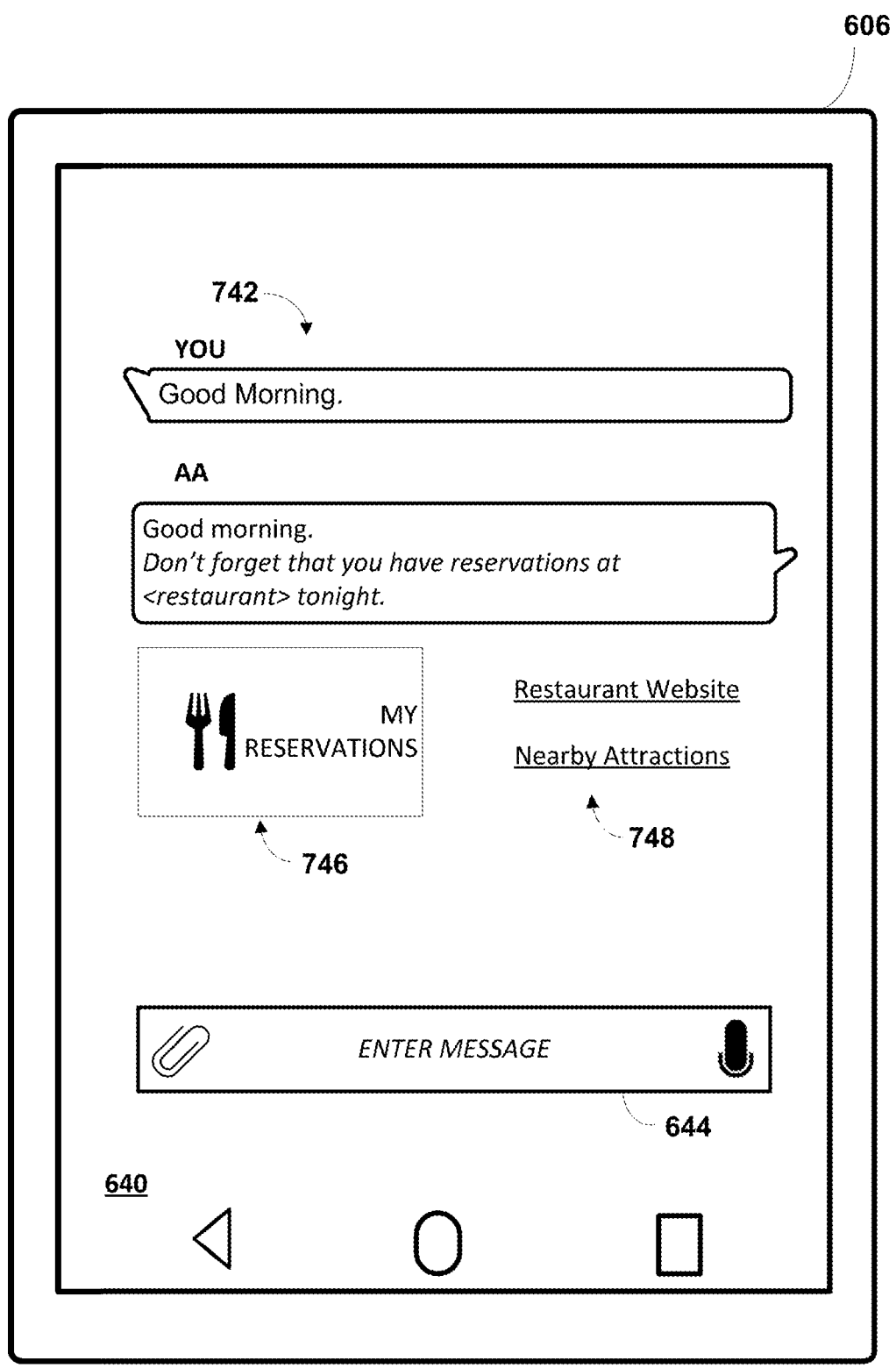

FIG. 7 once again depicts client device 606 with touchscreen 640 and user input field 644, as well as a transcript 742 of a human-to-computer dialog session. In this example, the user ("You") initiates the human-to-computer dialog by typing and/or speaking (which may be recognized and converted to text) the natural language input, "Good Morning." Automated assistant 120 ("AA") responds, "Good Morning." At this point, there are no further outstanding natural language requests from the user that need to be fulfilled. Accordingly, using techniques described herein, automated assistant 120 determines—e.g., from a calendar associated with the user, from correspondence (e.g., emails, text messages) exchanged by the user with others, from a restaurant application installed on client device 6060, etc.— that the user has a reservation this evening at <restaurant>. Accordingly, automated assistant 120 proactively incorporates the following statement into the human-to-computer-dialog: "Don't forget that you have reservations at <restaurant> tonight." Then, automated assistant 120 proactively incorporates a user interface element 746 that is selectable by the user to open the restaurant application ("MY RESERVATIONS") to a state in which the user can view and/or edit/cancel the reservation. Additionally, automated assistant 120 proactively incorporates other content of potential interest to the user, such as hyperlinks 748 to a website associated with the reservation and/or attractions near the restaurant. In some implementations, once the user arrives at the restaurant, different unsolicited content may be incorporated into the same human-to-computer dialog session or a new human-to-computer dialog session by automated assistant 120, such as pictures taken previously in the restaurant (by the users and/or by others), reviews, recommendations, specials, etc.

The examples of proactively-incorporated unsolicited content described above are not meant to be limiting. Other unsolicited content of potential interest to users may be proactively incorporated into human-to-computer dialogs using techniques described herein. For example, in some implementations in which a user has an upcoming scheduled flight (or train departure or other travel arrangement), automated assistant 120 may proactively incorporate unsolicited content into a human-to-computer dialog session with the user. This unsolicited content may include, for instance, a reminder that the user's flight is upcoming, one or more user interface elements that are selectable (by touch, voice, gesture, etc.) to open an application that enables the user to view or edit the scheduled flight, information about (or selectable user interface elements that link to) travel time to the airport, etc. Or, if automated assistant 120 determines (e.g., based on the user's schedule, position coordinate sensor, etc.) that the user's flight has landed at its destination, automated assistant 120 may proactively incorporate, into a new or preexisting human-to-computer dialog session, various information and/or user interface elements that might be of interest to the user, such as information/user interface elements related to calling a car service (or launching a ride sharing application), getting directions to a hotel or other attractions, nearby restaurants, etc.

As another example, automated assistant 120 may determine that changes have been made to one or more computing devices operated by a user (which may in some cases be part of a coordinated ecosystem of computing devices associated with the user). For example, automated assistant 120 may determine that, since the last human-to-computer dialog session with the user, one or more applications (including automated assistant 120 itself) installed on one or more client devices associated with the user have been updated. Because the user may be potentially interested in being informed about such updates, the automated assistant may incorporate unsolicited content into a human-to-computer dialog, such as "Welcome back. While you were away I learned to call a Taxi. Just tell me whenever you need one."

As yet another example, in some implementations, automated assistant 120 may determine various pieces of information that potentially may be of interest to a user (e.g., depending on one or more topics of general interest to the user, browsing history of the user, etc.) at particular times, and may proactively incorporate unsolicited content related to these pieces of information into a human-to-computer dialog session with the user. For example, suppose a particular user is interested in history and electronics. In various implementations, when automated assistant 120 determines that, during an existing human-to-computer dialog session, it has responded to all natural language inputs received from the user, automated assistant 120 may proactively incorporate information of potential interest to the user that is pertinent, for example, to the current day. For example, on Nicola Tesla's birthday, the user interested in history and electronics may be presented with a user interface element that is selectable by the user to open an app or webpage that is relevant to Tesla. As another example, suppose today is a user's wedding anniversary. Automated assistant may proactively incorporate, into an existing human-to-computer dialog session, graphical elements or other information that would be likely of interest to the user on the anniversary, such as links to flower websites, restaurants, etc.

As yet another example, in some implementations, a user's location (e.g., determined by a position coordinate sensor of a computing device carried by the user) may prompt automated assistant 120 to proactively incorporate unsolicited content into a human-to-computer dialog session with the user. For example, suppose the user is at or near a grocery store. Automated assistant 120 may determine, e.g., based on one or more grocery lists (e.g., stored locally on a client device or cloud-based) associated with the user, that there are items the user is supposed to pick up at the grocery store. Automated assistant 120 may then proactively incorporate unsolicited content into a human-to-computer dialog with the user, where the unsolicited content includes the needed items, information about the items, deals available for the items, etc.

As yet another example, in some implementations, information or actions frequently requested by a user may be proactively incorporated into a human-to-computer dialog session as unsolicited content. For example, suppose a user is conversing with automated assistant 120 about various topics, and that the time is approaching a typical time that the user eats dinner. In some implementations, automated assistant 120 may incorporate, into the existing human-to-computer dialog session, unsolicited content relating to eating, such as a user interface element that is selectable by the user to order pizza, open a recipe (from local memory or from a frequently-visited recipe webpage, etc.), etc. In other implementations, unsolicited content that may be incorporated into an existing human-to-computer dialog session may include, but is not limited to, trending news stories, trending searches, updated search results to search queries previously issued by the user, etc.

Of course, a user may not always desire unsolicited content. For example, a user may be driving in heavy traffic, may be in an emergency situation, may be operating a computing device in a manner that suggests the user would not want to receive unsolicited content (e.g., in a video call), etc. Accordingly, in some implementations, automated assistant 120 may be configured to determine (e.g., based on signals such as a location signal, context of a conversation, states of one or more applications, accelerometer signal, etc.) a measure of desirability by the user to receive unsolicited content, and may only provide unsolicited content if this measure satisfies one or more thresholds.

Similarly, in some implementations, automated assistant 120 may provide unsolicited content (as part of a new or existing human-to-computer dialog session) during particular time periods. For example, if a user is detected within earshot of a client device operating an automated assistant 120 between the hours of 7:00 AM and 8:00 AM, the automated assistant may 120 automatically output an unsolicited greeting, such as "Good morning," "Don't forget your umbrella because it's raining," "There is heavy traffic on the 405," "Here are today's headlines . . . ," "here is your schedule for today . . . ," etc.

As another example, in some implementations, automated assistant 120 may take into account activity of a plurality of users at a particular time and/or location to determine that a particular user is likely to positively receive unsolicited content. In various implementations, automated assistant 120 may analyze search queries from multiple users to identify spikes, trends, and/or other patterns in searches that can be associated with a particular location, a particular time of day, etc. For example, suppose many users visiting a landmark perform similar web searches on their mobile devices, such as "How many floors does it have," "when was it built," "how old is it," etc. After detecting a pattern or trend apparent among these searches, an automated assistant 120 may proactively provide unsolicited content to a new user when they arrive at the landmark.

Figure 8:
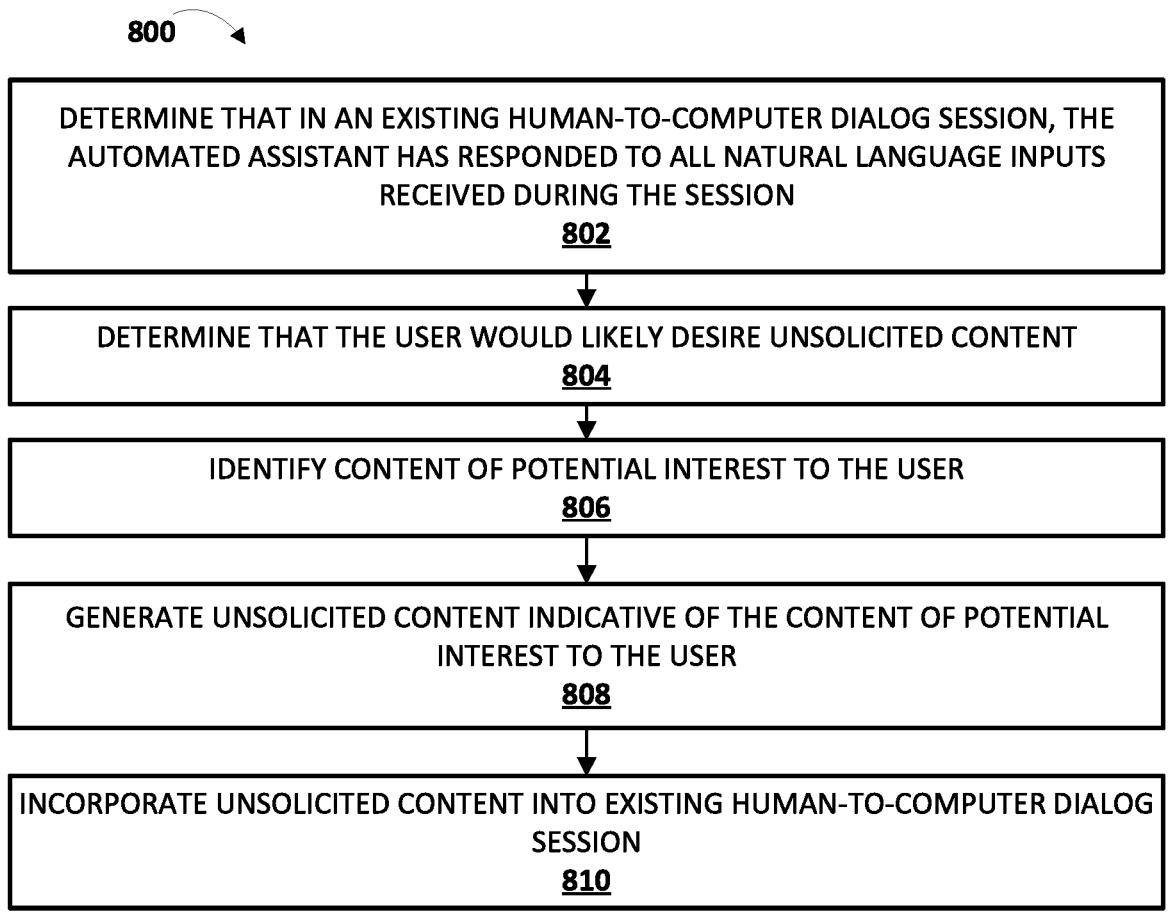
FIGS. 8 and 9 are flowcharts illustrating example methods according to implementations disclosed herein.

FIG. 8 is a flowchart illustrating an example method 800 according to implementations disclosed herein. For convenience, the operations of the flow chart are described with reference to a system that performs the operations. This system may include various components of various computer systems, such as one or more components of automated assistant 120. Moreover, while operations of method 800 are shown in a particular order, this is not meant to be limiting. One or more operations may be reordered, omitted or added.

At block 802, the system may determine that in an existing human-to-computer dialog session between a user and an automated assistant, the automated assistant has responded to all natural language input received from the user during the human-to-computer dialog session. In some implementations, this may include waiting for some predetermined time interval to elapse after responding to all natural language inputs, although this is not required.

In some implementations, the system may only go on to perform one or more of operations 806-810 in response to a further determination at block 804 that the user would likely desire unsolicited content (i.e., as may be represented by the aforementioned "desirability measure"). This further determination may be made based on various sources, such as the conversational context of the human-to-computer dialog session, the user's context determined from signal(s) independent of the human-to-computer dialog session (e.g., locational signals, accelerometer signals, etc.), or a combination thereof. For example, if it is determined, based on a user's accelerometer and/or position coordinate sensor signal, that the user is currently driving (e.g., after the user asked for a traffic update or directions), the system may determine that the user would not likely wish to be distracted by unsolicited content. As another example, the context of the human-to-computer dialog session may suggest that a user would not wish to be distracted with unsolicited content. For example, if a user asks an automated assistant for the location of the closest emergency room, or asks for treatment of an injury, the determined desirability measure may be relatively low (e.g., fail to satisfy a threshold), and the automated assistant may refrain from providing unsolicited content as a follow up to the requested information. As yet another example, if the user asks the automated assistant to trigger some action (e.g., initiate a video call, initiate a phone call, play a movie, etc.) that will likely take some time to complete and will require the user's attention, then the user would not likely wish to be distracted by additional unsolicited content.

At block 806, the system may identify, based on one or more characteristics of the user, information of potential interest to the user or one or more actions of potential interest to the user. As noted above, the operation of block 806 may be performed in response to the determinations of block 802-804, or it may be performed on an ongoing basis so that the automated assistant is "primed" to provide unsolicited content at any given point in time. In various implementations, the automated assistant may identify the information or action(s) of potential interest to the user based on a variety of sources, including but not limited to the user's search history, browsing history, human-to-computer dialog history (including the same session and/or previous sessions on the same or different client devices), location of the user (e.g., determined from a user's schedule, social network status (e.g., check in), position coordinate sensor, etc.), schedule/calendar, general topics of interest to the user (which may be manually set by the user and/or learned based on activity of the user), and so forth.

At block 808, the system may generate unsolicited content indicative of the information of potential interest to the user or the one or more actions of potential interest. This unsolicited content may include, for instance, natural language output that provides information of potential interest to the user in a natural language format (e.g., audibly output or in visual form), user interface elements (graphical or audible) that are selectable by the user to obtain additional information and/or trigger one or more tasks (e.g., set a reminder, create a calendar entry, create a reservation, open an application in a predetermined state, etc.), and so forth.

At block 810, the system may incorporate, into the existing human-to-computer dialog session, the unsolicited content generated at block 808. For example, the unsolicited content may be presented as natural language output from the automated assistant, user interface elements such as cards, hyperlinks, audible prompts, etc., and so forth. Incorporating unsolicited content into an existing human-to-computer dialog differs from, for instance, simply surfacing information to a user (e.g., as a card on a lock screen or a pull down menu). The user is already engaged in a human-to-computer dialog session with the automated assistant, and therefore the unsolicited content may be more likely to be seen/heard by the user and acted upon than if the content was simply surfaced to the user on a lock screen (which the user may often ignore and/or which may inundate the user with too many notifications).

Figure 9:
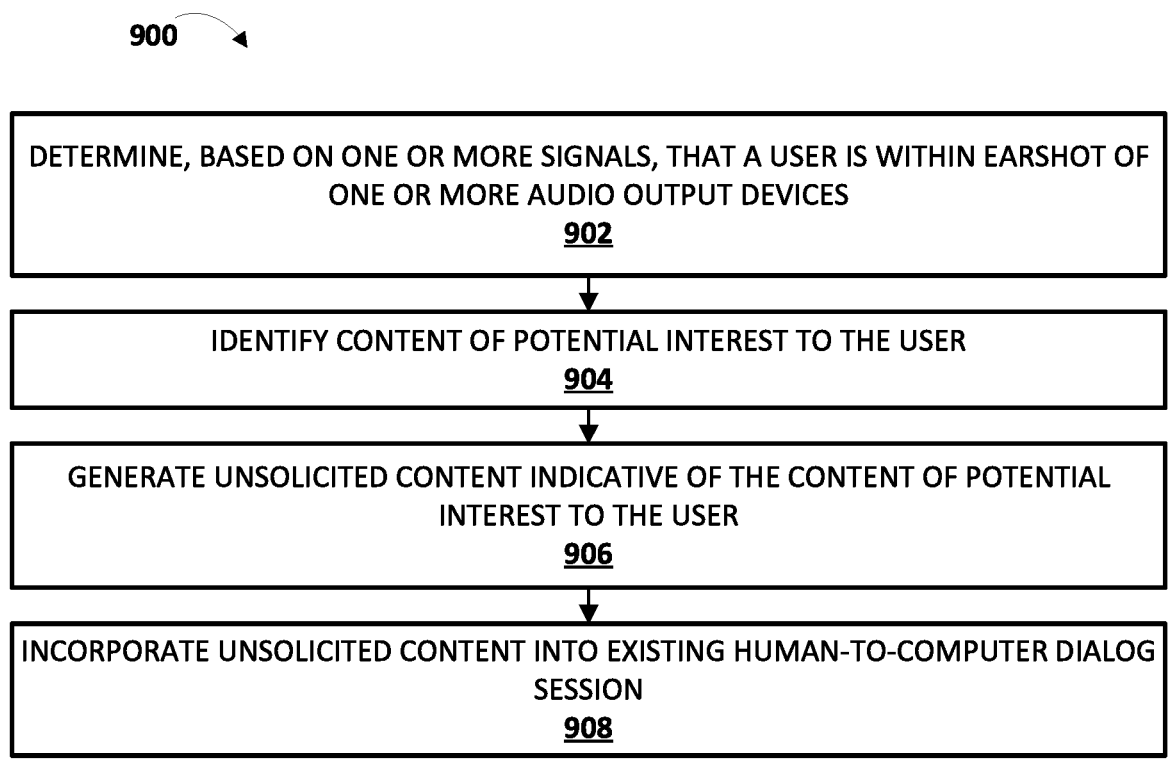

FIG. 9 is a flowchart illustrating an example method 900 according to implementations disclosed herein. For convenience, the operations of the flow chart are described with reference to a system that performs the operations. This system may include various components of various computer systems, such as one or more components of automated assistant 120. Moreover, while operations of method 900 are shown in a particular order, this is not meant to be limiting. One or more operations may be reordered, omitted or added.

At block 902, the system may determine, based on one or more signals, that a user is within earshot of one or more audio output devices (e.g., one or more speakers operably coupled with a computing device executing an instance of an automated assistant, a standalone interactive speaker executing an instance of an automated assistant, etc.). These signals may take various forms. In some implementations, the one or more signals may be triggered by a computing device operated by a user that is distinct from the system and are received at one or more communication interfaces operably coupled with the one or more processors. For example, one computing device could push notification to other computing devices that the user is engaged in a particular activity, such as driving, operating a particular application (e.g., to playback music or a movie), etc. In some implementations, the one or more signals may include detection of co-presence of the system and the computing device. In some implementations, the one or more signals may include an indication of a state of an application executing on the computing device that is separate from the system, such as that a user is preparing a document, performing various searches, playing back media, viewing photos, engaging in a phone/video call etc. In some implementations, the human-to-computer dialog may be initiated in response to the determination that the user is within earshot of the one or more audio output devices, although this is not required. Blocks 904-908 of FIG. 9 may be similar to blocks 804-808 of FIG. 8. While not depicted in FIG. 9, in various implementations, automated assistant may determine whether the user is likely to desire unsolicited content before providing it, as described above with respect to block 804.

Figure 10:
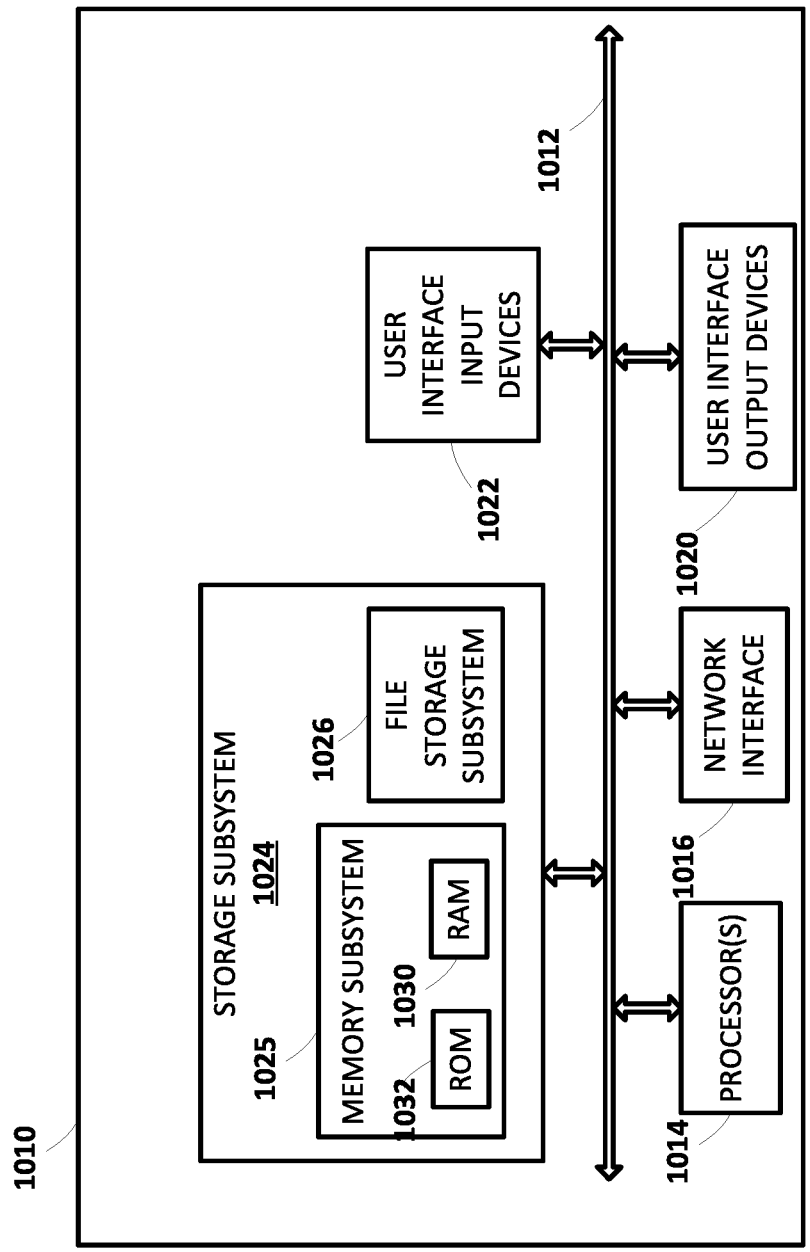
FIG. 10 illustrates an example architecture of a computing device.

FIG. 10 is a block diagram of an example computing device 1010 that may optionally be utilized to perform one or more aspects of techniques described herein. In some implementations, one or more of a client computing device, automated assistant 120, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the methods of FIGS. 8 and 9, as well as to implement various components depicted in FIG. 1.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined. In the context of the present disclosure, any relationships captured by the system, such as a parent-child relationship, may be maintained in a secure fashion, e.g., such that they are not accessible outside of the automated assistant using those relationships to parse and/or interpret natural language input.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    determining that in an existing human-to-computer dialog session between a user and an automated assistant, the automated assistant has responded to all natural language input received from the user during the human-to-computer dialog session;
    determining a desirability measure that is indicative of the user's desire to receive unsolicited content, wherein the desirability measure is determined based on one or more signals indicative of a current context of the user;
    identifying, based on one or more characteristics of the user, information of potential interest to the user or one or more actions of potential interest to the user;
    generating unsolicited content indicative of the information of potential interest to the user or the one or more actions of potential interest; and
    incorporating, into the existing human-to-computer dialog session, the unsolicited content;
    wherein at least the incorporating is performed in response to a determination that the desirability measure satisfies one or more thresholds.

2. The method of claim 1, wherein the unsolicited content comprises unsolicited natural language content.

3. The method of claim 1, wherein the one or more signals include an indication of a state of an application executing on another computing device.

4. The method of claim 3, wherein the indication of the state of the application includes an indication that the application is providing media playback.

5. The method of claim 1, wherein the one or more signals include an action the user requested the automated assistant to trigger during the human-to-computer dialog session.

6. The method of claim 1, wherein the one or more signals include mention of an emergency in the human-to-computer dialog session.

7. The method of claim 1, wherein the one or more signals indicate the user is driving.

8. The method of claim 1, wherein the one or more signals include an accelerometer signal.

9. The method of claim 1, wherein the one or more signals include one or more topics detected in the human-to-computer dialog session.

10. The method of claim 9, wherein the one or more topics include traffic or directions.

11. A system comprising one or more processors and memory storing instructions that, in response to execution of the instructions by the one or more processors, cause the one or more processors to:
    determine that in an existing human-to-computer dialog session between a user and an automated assistant, the automated assistant has responded to all natural language input received from the user during the human-to-computer dialog session;
    determine a desirability measure that is indicative of the user's desire to receive unsolicited content, wherein the desirability measure is determined based on one or more signals indicative of a current context of the user;
    identify, based on one or more characteristics of the user, information of potential interest to the user or one or more actions of potential interest to the user;
    generate unsolicited content indicative of the information of potential interest to the user or the one or more actions of potential interest; and
    incorporate, into the existing human-to-computer dialog session, the unsolicited content;
    wherein at least the incorporation is performed in response to a determination that the desirability measure satisfies one or more thresholds.

12. The system of claim 11, wherein the unsolicited content comprises unsolicited natural language content.

13. The system of claim 11, wherein the one or more signals include an indication of a state of an application executing on another computing device.

14. The system of claim 13, wherein the indication of the state of the application includes an indication that the application is providing media playback.

15. The system of claim 11, wherein the one or more signals include an action the user requested the automated assistant to trigger during the human-to-computer dialog session.

16. The system of claim 11, wherein the one or more signals include mention of an emergency in the human-to-computer dialog session.

17. The system of claim 11, wherein the one or more signals indicate the user is driving.

18. The system of claim 11, wherein the one or more signals include an accelerometer signal.

19. The method of claim 11, wherein the one or more signals include one or more topics detected in the human-to-computer dialog session.

20. At least one non-transitory computer-readable medium comprising instructions that, in response to execution of the instructions by one or more processors, cause the one or more processors to perform the following operations:
    determining that in an existing human-to-computer dialog session between a user and an automated assistant, the automated assistant has responded to all natural language input received from the user during the human-to-computer dialog session;

determining a desirability measure that is indicative of the user's desire to receive unsolicited content, wherein the desirability measure is determined based on one or more signals indicative of a current context of the user;

identifying, based on one or more characteristics of the user, information of potential interest to the user or one or more actions of potential interest to the user;

generating unsolicited content indicative of the information of potential interest to the user or the one or more actions of potential interest; and incorporating, into the existing human-to-computer dialog session, the unsolicited content;

wherein at least the incorporating is performed in response to a determination that the desirability measure satisfies one or more thresholds.

* * * * *